May 13, 1930.  A. C. SMITH  1,758,477
REFRIGERATING TRUCK
Filed Dec. 20. 1927
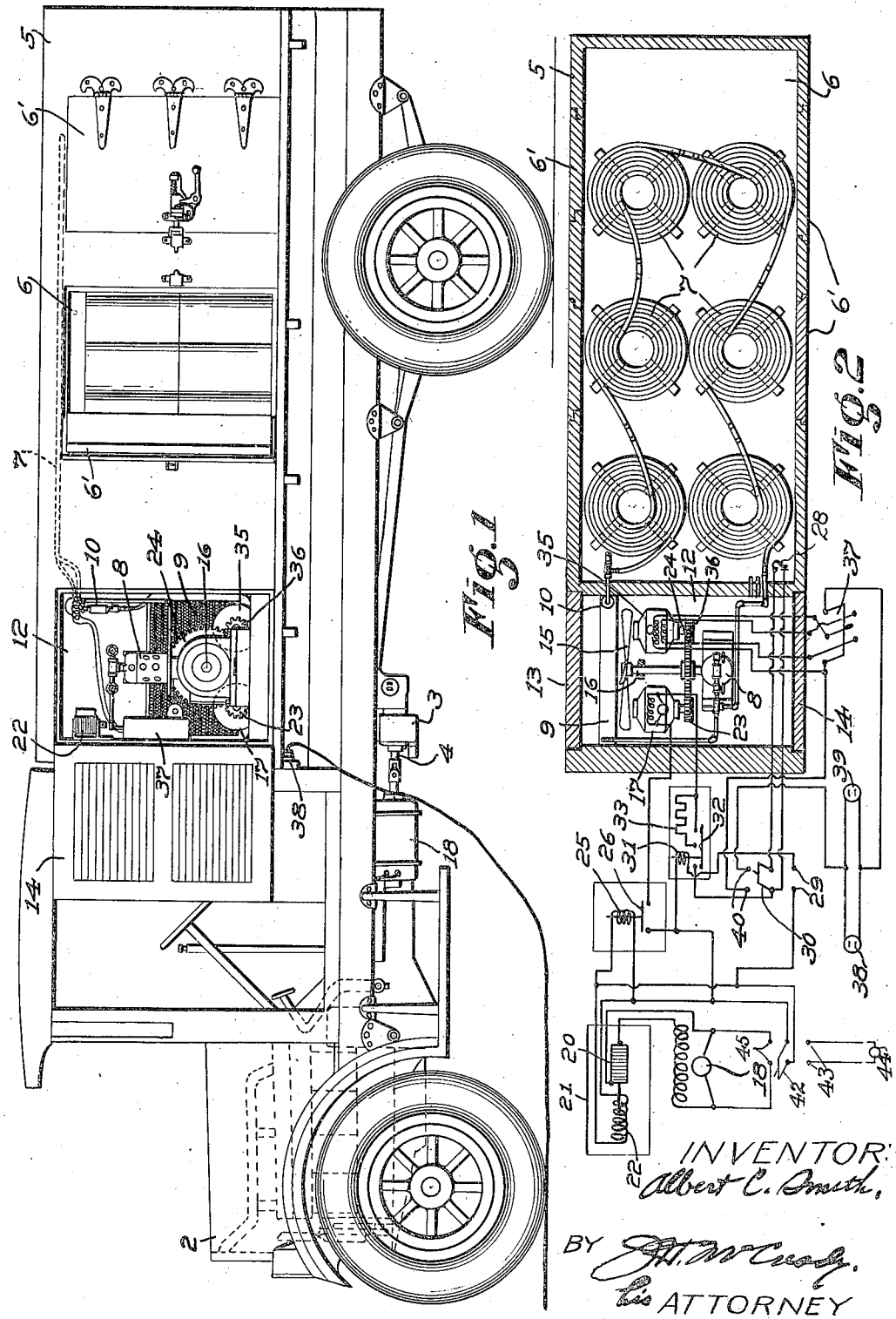
INVENTOR
Albert C. Smith,
BY
his ATTORNEY Patented May 13, 1930

1,758,477

UNITED STATES PATENT OFFICE

ALBERT C. SMITH, OF WINTHROP, MASSACHUSETTS, ASSIGNOR TO WILLIAM F. BAIRD, OF BOSTON, MASSACHUSETTS

REFRIGERATING TRUCK

Application filed December 20, 1927. Serial No. 241,4..

This invention involves a motor truck designed especially for use in the distribution of frozen foods and the like.

Certain frozen and perishable foods are now produced or prepared for the market in large central plants, and are then delivered by motor truck to retailers distributed over a wide area. This is particularly true of ice cream, although some other foods are handled in essentially the same manner. It is necessary to keep the ice cream frozen during transportation and for this purpose it is the usual practice to pack the ice cream in cans and to pack these cans in a mass of chopped ice held in the truck body. The ice wastes rapidly in summer temperatures, and on long hauls in hot weather there is great danger of the ice cream becoming soft and unsaleable. Furthermore, this practice involves the handling and transportation of a heavy unprofitable load, namely, the ice.

With a view to overcoming these difficulties it has been proposed heretofore to equip a truck with a refrigerating plant. But the operation of a refrigerating plant from the power plant of a truck in a manner which is reasonably economical of power, has the requisite degree of reliability, and does not involve excessive first cost and operating expense, presents very difficult practical problems. The problem is complicated by the fact that the power for driving the pump or compressor of the refrigerating system varies from zero to very high values, whereas it is impractical to drive the pump or compressor at such variable speeds, the nearer constant the speed of the compressor can be kept, the better from a refrigerating standpoint.

To devise a satisfactory solution for these problems forms the chief object of this invention.

The nature of the invention will be readily understood from the following description when read in connection with the accompanying drawings, and the novel features will be particularly pointed out in the appended claims.

In the drawings,

Figure 1 is a side elevation showing a truck equipped with refrigerating apparatus embodying this invention, some parts of the apparatus being shown diagrammatically; and Fig. 2 is a plan view, partly in cross-section, showing diagrammatically the organization of the system.

While the invention may be applied to any suitable type of truck, the truck shown is of a common construction so far as the chassis and the features of general organization are concerned, with the exceptions to be hereinafter described. It includes a power plant consisting of an engine 1 of the internal combustion type mounted under the hood 2 and driving connections to the rear wheels, these connections including a transmission mechanism, parts of which are mounted in the transmission casing 3. Preferably a truck is used to which a power take-off can be applied to the transmission. That is, an attachment is secured to the transmission casing, this attachment including a shaft 4 carrying a gear which meshes with a gear in the transmission so that this shaft is permanently connected with the power plant of the truck and power can be taken off the shaft 4 for any purpose. Such constructions are commonly used in dump trucks.

The body is mounted on the chassis and is provided with a refrigerating chamber 6 which is well insulated and may be of any form suited to the requirements of the material to be handled. Doors 6' open into opposite sides of the chamber and permit the introduction and removal of the cans or packages of ice cream, or the like. This truck is equipped with a refrigerating system which preferably, although not necessarily, is of the compression type, designed to use a refrigerant such, for example, as methyl chloride or sulphur dioxid. The system includes expansion coil units 7 mounted in the upper part of the refrigerating chamber 6 and connected together so that they form, in effect, a single coil. Pipe connections lead the expanded gas to a compressor or pump 8 from which the refrigerant is discharged into a condenser 9. The compressed and liquefied refrigerant collects in a chamber at the lower part of the condenser and subsequently flows through an expansion valve 10 into the expansion coil 7. This organization of refrigerating system is like those heretofore used, no novelty being claimed in the system itself, and no attempt being made to show all the details of this system, such as the control valves, and the like.

It will be observed that the compressor 8 and condenser 9 are mounted in a compartment 12, which may be designated as the machine compartment to distinguish it from the refrigerating compartment 6, the former compartment being preferably located transversely in the forward part of the truck body. Doors 13 and 14 are provided to open or close the opposite ends of the compartment 12, each of these doors preferably being of a shutter or louvre type so that they afford a free circulation of air through the compartment 12 from one end thereof to the other even when they are closed. Such a circulation of air is utilized to cool the condenser 9, and for the purpose of creating a sufficient flow of air, a fan 15, Fig. 2, is located immediately behind the condenser and is mounted on the compressor shaft 16.

As above indicated, an important problem in the operation of a system of this character is to drive the compressor 8 at a fairly constant speed, or at least without excessive speed variation, from the power plant of the truck, the speed of which varies anywhere from a few revolutions per minute to 2,000 R. P. M., or even more. I have satisfactorily solved this problem by driving the compressor 8 from an electric motor 17 and supplying the current for this motor from a direct current generator 18 which preferably is mounted on the chassis of the truck and is directly connected with the power take-off shaft 4 previously referred to. With this arrangement the generator armature will revolve at a speed equal, or at least proportionate, to the speed of the truck engine. Consequently, the voltage delivered by the generator will vary widely.

In order to reduce variations in the voltage impressed on the motor 17 I prefer to use a voltage regulator in connection with the direct current generator, and any suitable automatic regulator may be used for this purpose. The regulator indicated in the drawings is of the well known type in which a series of carbon plates are arranged to be pressed more or less together.

Referring to Fig. 2 it will be observed that a series of carbon plates 20 of the voltage regulator 21 are connected directly in series with the field of the generator 18, while the solenoid 22 of the regulator is connected across the terminals of the generator. This solenoid acts on a core which is connected with the plates 20, the arrangement being such that the plates are presesd together and offer a minimum of resistance when the generator voltage is low and are gradually allowed to separate to increase the resistance as the generator voltage builds up. This organization results in reducing very materially the variations in voltage impressed on the motor, and consequently reduces variations in motor speed and therefore in the compressor speed. Assuming, for example, that the normal potential of the generator 18 is 110 volts, it will not run substantially over this figure, except in case of accident, even at maximum truck speeds. At idling speeds the potential may drop to in the neighborhood of 75 volts. This will mean some variation in the motor speed, but the motor preferably is connected with the compressor through a reduction gearing. As shown, the motor 17 carries a pinion 23 driving a relatively large gear 24 on the compressor shaft 16. The compressor speed therefore is always very much lower than the motor speed, and consequently variations in the motor speed will produce much smaller variations in the speed of the compressor. Such an arrangement maintains the compressor speed within entirely satisfactory limits.

The circuit connections between the generator 18 and the motor 17 will be clear from an inspection of the wiring diagram in Fig. 2. In order to protect the motor in the event that the generator voltage rises to excessive values, a high voltage circuit breaker is included in the motor circuit, this piece of apparatus comprising a solenoid 25 connected across the generator terminals and arranged to open a switch 26 when current exceeding a predetermined value flows through it, as will be readily understood by those skilled in this art.

Provision is also made for automatically controlling the operation of the compressor in accordance with the temperature in the refrigerating chamber 6. For this purpose a thermostat, indicated diagrammatically at 28, Fig. 2, is mounted in the chamber 6 and is connected through a double throw switch 30 with a solenoid 31 controlling a switch 32. Normally the switch 30 is thrown down, and is in engagement with the contacts 29, and so long as the temperature in the refrigerating chamber 6 remains below the value for which the thermostat 28 is set, the circuit through the thermostat and the solenoid 31 will be open, the solenoid 31 will be de-energized, the switch 32 will remain open, and the motor 17 will be idle. When, however, the temperature in the refrigerating chamber rises above a predetermined point, the contacts of the solenoid 28 then will be closed and current will flow through the solenoid 31, thus causing it to close the switch 32 and start the motor 17, these operations all taking place automatically. When the temperature in the refrigerating chamber again drops sufficiently to cause the thermostat contacts to open, the motor will again be shut down.

Preferably the switch 32 is arranged to connect the resistance 33 into the motor circuit before cutting out the motor entirely, so that excessive sparking of the contacts will be avoided. In closing this switch, also, the resistance is first cut into the circuit so that the full potential of the generator is not immediately impressed on the motor.

It is sometimes necessary to leave a loaded truck in a garage overnight, or for some substantial period, during which the power plant of the truck will be idle. In order to operate the refrigerating systems under these conditions, an alternating current motor 35 is mounted in the machine chamber 12 beside the direct current motor 17 and is provided with a pinion 36 to mesh with and drive the compressor gear 24. An alternating current motor is used for this purpose, since alternating current is used almost universally in lighting systems. Preferably, also, the circuit connections are such, as shown in Fig. 2, that the generator 18 can be disconnected from the motor circuit by throwing the switch 42 down into engagement with the contacts 43 which lead to a socket 44 into which any suitable source of direct current can be plugged, it being understood that normally the switch 42 engages the upper contacts 45. The D. C. motor, therefore, can be operated from an outside source of current. The circuit connections for the A. C. motor 35 include an automatic starting switch 37, Fig. 2, of a usual type, sockets or connectors 38 and 39 in parallel with the motor and adapted to be connected to any convenient source of alternating current, and contacts 40, Fig. 2, for connecting the thermostat 28 in the motor circuit simply by throwing the switch 30 upward. This arrangement permits the thermostat 38 to control automatically the operation of the A. C. motor 35 in accordance with the changes of temperature in the refrigerating chamber 6.

It has been demonstrated in practice that this invention effectually solves the difficulty of operating the refrigerating system from the power plant of a truck. A truck equipped with apparatus such as that shown not only keeps its load cool in weather and under conditions which would prove exceedingly troublesome for a truck depending upon ice, but it also avoids the handling and hauling of the ice. The radius of operations of the truck is widened, and it can be used for a greater variety of service than a truck in which ice is depended upon. The first cost as well as the operating expense of an installation of this character are within reasonable limits, its efficiency is satisfactory, and it possesses a high degree of reliability so that it can be placed in the hands of the ordinary driver with entire confidence that the system will operate satisfactorily and that the driver will have no occasion to touch it.

While a typical organization embodying this invention has been herein shown and described, it will be evident that the invention may be embodied in other forms without departing from the spirit or scope thereof. For example, the generator can be mounted and driven in other ways than shown, although the arrangement illustrated has certain advantages.

Having thus described my invention, what I desire to claim as new is:

1. In a motor truck having a power plant adapted to drive the same, the combination of a refrigerating system mounted in the truck and including a compressor, an electric generator driven from said power plant, an electric motor, driving connections between said motor and said compressor, and circuit connections for supplying said motor with current from said generator.

2. In a motor truck having a power plant adapted to drive the same, the combination of a refrigerating system mounted in the truck and including a compressor, an electric generator, positive driving connections between said electric generator and said power plant, an electric motor, driving connections between said motor and said compressor, and circuit connections for supplying said motor with current from said generator.

3. In a motor truck having a power plant adapted to drive the same, the combination of a refrigerating system mounted in the truck and including a compressor, an electric generator driven from said power plant, an automatic voltage regulator for said generator, an electric motor, circuit connections for supplying said motor with current from said generator, and driving connections between said motor and said compressor.

4. In a motor truck having a power plant adapted to drive the same, the combination of a refrigerating system in the truck, said system including a compressor, a direct current electric generator mounted on the chassis of the truck, positive driving connections between said generator and said power plant, an electric motor, circuit connections for supplying said motor with current from said generator, an automatic voltage regulator for said generator, and positive driving connections between said motor and said compressor.

5. In a motor truck having a power plant adapted to drive the same and a transmission mechanism actuated thereby and including a power take-off shaft, the combination of a direct current electric generator mounted on the chassis of the truck and directly connected to said shaft, a refrigerator system in said truck, said system including a compressor, an electric motor connected with said compressor to drive the same, circuit connections for supplying said motor with current from said generator, and an automatic voltage regulator for said generator.

6. In a motor truck having a power plant adapted to drive the same, the combination of a refrigerating system in the truck, said system including a compressor, a direct current electric generator mounted on the chassis of the truck, positive driving connections between said generator and said power plant, an electric motor, circuit connections for supplying said motor with current from said generator, an automatic voltage regulator for said generator, driving connections between said motor and said compressor, said system being operable when the power plant of the truck is idle.

7. In a motor truck having a power plant adapted to drive the same, the combination of a refrigerating system mounted in the truck and including a compressor, an electric generator driven from said power plant, an electric motor, driving connections between said motor and said compressor, circuit connections for supplying said motor with current from said generator, and automatic means for maintaining the speed of the compressor within relatively narrow limits notwithstanding wide variations in the speed of said power plant.

8. In a motor truck having a power plant adapted to drive the same, the combination of a truck body having a refrigerating compartment therein and a machine compartment arranged in the truck and separate from said refrigerating compartment, said machine compartment opening laterally at one side of the body, a refrigerating system in said body including a condenser located in said machine compartment and adjacent to said opening, said system also including a fan and compressor in said machine compartment, an electric motor for driving said fan and compressor, an electric generator driven from said power plant, and circuit connections for supplying said motor with current from said generator.

9. In a motor truck having a power plant adapted to drive the same, the combination of a truck body having a refrigerating compartment therein, a refrigerating system in said truck, said system including an expansion coil in said compartment and a compressor, a direct current electric generator mounted on said truck and driven from the power plant, an electric motor connected with said compressor to drive the same, circuit connections for supplying said motor with current from said generator, an automatic voltage regulator for said generator, a thermostat in said compartment, a solenoid in circuit with said thermostat, and a switch controlled by said solenoid for opening or closing the motor circuit.

10. In a motor truck having a power plant adapted to drive the same, the combination of a truck body having a refrigerating compartment therein, a refrigerating system in said truck, said system including an expansion coil in said compartment and a compressor, a direct current electric generator mounted on said truck and driven from the power plant, an electric motor connected with said compressor to drive the same, circuit connections for supplying said motor with current from said generator, an alternating current motor mounted in said truck and connected with said compressor to drive the same when the power plant of the truck is idle, a thermostat in said compartment, and means whereby said thermostat is enabled to control the operation of either of said motors automatically in response to changes in temperature in said refrigerating compartment.

11. In a motor truck having a power plant adapted to drive the same, the combination of a refrigerating system mounted in the truck and including a compressor, an electric generator driven from said power plant, an electric motor connected with said compressor to drive the same, circuit connections for supplying said motor with current from said generator, automatic means for maintaining the speed of the compressor within relatively narrow limits notwithstanding wide variations in the speed of said power plant, and connections whereby said motor may be driven from an additional source of power.

12. In a motor truck having a power plant adapted to drive the same, the combination of a refrigerating system mounted in the truck and including a compressor, an electric generator driven from said power plant, an electric motor, driving connections between said motor and said compressor, circuit connections for supplying said motor with current from said generator, an automatic voltage regulator for said generator, and means whereby said compressor may be operated from a source of electricity other than said generator.

13. In a motor truck having a power plant adapted to drive the same, the combination of a refrigerating system mounted in the truck and including a compressor, an electric generator driven from said power plant, an electric motor connected with said compressor to drive the same, circuit connections for supplying said motor with current from said generator, automatic means incapable of generating power for maintaining the speed of the compressor within relatively narrow limits notwithstanding wide variations in the speed of said power plant, and connections whereby said motor may be driven from an additional source of power.

14. In a motor truck having a power plant adapted to drive the same, the combination of a truck body having a refrigerating compartment therein, a refrigerating system in said truck, said system including an expansion coil in said compartment and a compressor, a direct current electric generator mounted on the truck and driven from said power plant, an electric motor connected with said compressor to drive the same, circuit connections for supplying said motor with current from said generator, an automatic voltage regulator for said generator, and means for automatically controlling said motor in accordance with the requirements of said refrigerating system.

ALBERT C. SMITH.